United States Patent [19]
Myerson et al.

[11] Patent Number: 5,667,555
[45] Date of Patent: Sep. 16, 1997

[54] METHOD FOR THE REMOVAL OF CALCIUM BY PRODUCTS DURING THE PRODUCTION OF AN IRON FEEDSTOCK

[75] Inventors: Allan S. Myerson, Brooklyn, N.Y.; Charles A. Burrows, Atlanta, Ga.; Charles W. Sanzenbacher, Charlotte, N.C.; Paul R. DiBella, Ball Ground, Ga.

[73] Assignee: Metals Recycling Technologies Corp., Atlanta, Ga.

[21] Appl. No.: 604,178

[22] Filed: Feb. 21, 1996

Related U.S. Application Data

[63] Continuation-in-part of Ser. No. 380,950, Jan. 31, 1995, Pat. No. 5,582,631, which is a continuation-in-part of Ser. No. 360,394, Dec. 21, 1994, Pat. No. 5,571,306, which is a continuation-in-part of Ser. No. 348,446, Dec. 2, 1994, abandoned, which is a continuation-in-part of Ser. No. 238,250, May 4, 1994, Pat. No. 5,464,596, which is a continuation-in-part of Ser. No. 953,645, Sep. 29, 1992, abandoned, which is a continuation-in-part of Ser. No. 820,987, Jan. 15, 1992, Pat. No. 5,208,004.

[51] Int. Cl.⁶ ............................................. C22B 3/14

[52] U.S. Cl. .................. 75/419; 75/420; 75/570; 75/724; 75/961

[58] Field of Search .......................... 75/419, 420, 961, 75/570, 724

[56] References Cited

U.S. PATENT DOCUMENTS

5,464,596 11/1995 Myerson ............................... 75/724

Primary Examiner—Melvyn Andrews
Attorney, Agent, or Firm—Deveau, Colton & Marquis

[57] ABSTRACT

A method for the removal of calcium byproducts created during the production of an iron-based feedstock suitable for use as the feedstock for steel mills, from industrial waste streams containing iron, by treating the waste stream with an ammonium chloride leaching solution, treating the leachant with a soluble ammonium salt in which the negative ion will form an insoluble compound with calcium, and separating the undissolved precipitates comprising iron compounds and calcium compounds from the leachant solution. The undissolved precipitants may be treated further by elevated temperature roasting, resulting in the iron-based feedstocks.

14 Claims, 1 Drawing Sheet

FIG. 1

METHOD FOR THE REMOVAL OF CALCIUM BY PRODUCTS DURING THE PRODUCTION OF AN IRON FEEDSTOCK

STATEMENT OF RELATED APPLICATIONS

This application is a continuation-in-part of application Ser. No. 08/380,950, filed Jan. 31, 1995, now U.S. Pat. No. 5,582,631, which is a continuation-in-part of application Ser. No. 08/360,394, filed on Dec. 21, 1994, now U.S. Pat. No. 5,571,306, which is a continuation-in-part of application Ser. No. 08/348,446, filed on Dec. 2, 1994, abandoned, which is a continuation-in-part of application Ser. No. 08/238,250 filed on May 4, 1994, now U.S. Pat. No. 5,464,596, which is a continuation-in-part of application Ser. No. 07/953,645 filed on Sep. 29, 1992, abandoned, which is a continuation-in-part of application Ser. No. 07/820,987 filed on Jan. 15, 1992, which issued as U.S. Pat. No. 5,208,004 on May 4, 1993.

BACKGROUND OF THE INVENTION

1. Field of the Invention

The present invention relates generally to a process for the recovery of usable economically valuable products, including a relatively pure iron or direct reduced iron product feedstock and, optionally, an iron oxide and an iron-carbon residual, from industrial waste streams typically comprising zinc compounds and iron compounds. The process comprises the general steps of an ammonium chloride leach and an elevated temperature roast, along with specific steps for recovering the desired products. The present invention also relates generally to an enhanced recycling process which utilizes iron-rich materials produced by the invention as a feedstock ultimately to a steel mill.

The specific improvement of the present invention is an additional process for the removal of calcium impurities remaining after the ammonium chloride leach. Due to the continuous nature of the process, calcium impurities may build up, resulting in lower efficiency. The use of a secondary ammonium salt, different from ammonium chloride, helps alleviate this calcium impurity build up, maintaining efficiency.

2. Prior Art

Industrial waste streams typically contain components which have economic value if they can be recovered in an economic fashion. For example, U.S. Pat. No. 3,849,121 to Burrows, now expired but which was assigned to a principal of the assignee of the present invention, discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out and discard the iron oxides and waste metals, so that the resulting zinc-compound-rich solution can be further treated to recover the zinc compounds.

Waste metal process dust typically has varying amounts of other components, in various forms, such as calcium, contained in the dust. The Burrows patent does not teach the treatment or recovery of any values from the discarded iron oxide containing precipitates, and does not discuss any method of relieving the build up of impurities, such as calcium compounds, which occurs during continuous operation of the process.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon to leach the flue dust at room temperature, resulting in the extraction of only about half of the zinc in the dust, almost 7% of the iron, less than 5% of the lead, and less than half of the cadmium. However, Peters does not disclose a method for further treating the removed components not containing zinc compounds, nor of removing impurities, such as calcium compounds, which build up during the process.

As can be seen, there exists a need for a method which will allow the continuous treatment of exhausts and fumes from reduction furnaces or the like to recover values in a manner which relieves or avoids the build up of calcium impurities which can affect the efficiency of the process. This need is addressed by the present invention.

BRIEF SUMMARY OF THE INVENTION

The present invention satisfies these needs in a method which recovers a relatively pure iron product from a combination of waste materials from industrial processes, such as a combination of waste streams from electric arc furnaces, typically containing zinc or zinc oxide, and exhaust fumes from reduction furnaces, which typically are iron-poor. The non-iron solids and feed and product solutions used and/or produced in the process can be recycled such that the process has minimal solid or liquid wastes. Other solids can be recovered by treating other compounds in the waste materials, for example zinc oxide, zinc, metal values, and other residues, all of which can be used in other processes. As an alternative embodiment, iron-rich waste products, such as for example mill scale and used batteries, also can be added to the waste stream feed of the present process. During the process, potential efficiency-robbing constituents, such as certain calcium compounds, are removed, resulting in an efficient continuous recovery process.

A waste materials stream typically comprising zinc compounds and iron compounds, such as electric arc furnace (EAF) dust, is subjected to a combination of processing steps, resulting in an enriched iron compound (an enriched iron cake or EIC) which can be used as a feedstock for steel mills, and other products of value. The EIC typically is rich in direct reduced iron (DRI). Preferably, the precipitate containing iron oxides is removed from a process for the recovery of zinc oxide and zinc metal from industrial waste streams. During the recovery process, carbon compounds can be added to the waste stream, and a cake product is produced from the undissolved iron and carbon compounds, which also can be used as a feedstock for steel mills.

In a preferred embodiment of the process, the waste material stream is roasted, resulting in the reduction of the iron compounds into DRI, and the production of combustion products. The DRI can be fed directly to a steel mill as a feed source, and the combustion products, typically in the form of exhaust dusts and fumes, are recovered in a filter means, such as a baghouse. The exhaust dusts and fumes comprise the majority of the non-iron compounds, such as zinc, cadmium, copper, lead, and calcium compounds.

Fumes exhausted from the reduction furnace can be processed by a baghouse or/and by a wet scrubber and the captured materials are then recycled and/or recovered as chemical values. The fumes can be filtered in a baghouse at the steel mill or at an independent location. The filter cake taken from the baghouse, which is an iron-poor mixture, may be combined with the initial waste feed (such as EAF dust) and/or other iron-rich materials, and processed according to this invention in a cyclical fashion.

An alternative method of removing the particulate matter from the reduction furnace fumes is by the use of a wet scrubber. A primary embodiment of the alternative recycle of the present invention is to pass the reduction furnace fumes through a recirculated water wet scrubber, such as a venturi scrubber. The fume constituents soluble in water will be removed from the fumes by the recirculated water. The loaded recirculated water then may be introduced to an ammonium chloride leach step. Alternatively, the wet scrubber can use an ammonium chloride solution instead of water. The particulate matter soluble in ammonium chloride, such as for example zinc, cadmium, and lead constituents, will be removed in the ammonium chloride solution in the wet scrubber. The loaded ammonium chloride solution then can be combined with the leaching step discussed above, resulting in an exceptional increase in the recycle of waste streams from, for example, the steel making process.

Calcium present in the fumes may be leached by the ammonium chloride solution. A build up of calcium in the ammonium chloride leach will reduce the ability of the ammonium chloride to leach zinc from the waste material. A secondary ammonium salt such as, preferably, ammonium sulfate or ammonium hydroxide, is added to the leach tank prior to charging with the waste material to precipitate out the calcium ions as calcium sulfate if ammonia sulfate is added or as calcium hydroxide if ammonia hydroxide is added. The loaded recirculating water or ammonium chloride solution (the scrubbant) then may be recycled to the ammonium chloride leach step of the present invention, as discussed below, without creating a calcium build up in the scrubbant.

The treatment of EAF dust to recover metal values and an iron product is discussed in previous patents and patent specifications of the present inventors and/or their assignees. EAF dust, either alone or in combination with iron-rich waste materials, mill scale, used batteries, or other iron-rich or iron-poor waste materials may be used as the initial feed for the process. This combined waste first may be roasted, reducing any iron oxides present to usable DRI. This combined waste material then may be leached with an ammonium chloride solution resulting in a product solution (leachate) and undissolved materials (precipitate). In the leaching step, the zinc and/or zinc oxide dissolves in the ammonium chloride solution along with other metal oxides contained in the waste material, such as lead oxide and cadmium oxide. The resultant solution is filtered to remove the undissolved materials, including iron oxides and inert materials such as silicates, which will not dissolve in the ammonium chloride solution. The product solution and the undissolved materials are separated, with both the product solution and the undissolved materials being further treated to recover valuable components. For example, the remaining product solution can be treated to produce a zinc oxide product of 99% or greater purity. Alternatively, the remaining product solution can be subjected to electrolysis in which zinc metal plates onto the cathode of the electrolysis cell. Any remaining product solution after crystallization or electrolysis can be recycled back to treat incoming waste material.

The undissolved material separated from the product solution is rich in iron oxides, and typically has some impurities such as zinc ferrite. The undissolved materials can be used without further treatment as a feedstock for steel mills so long as the quantity of impurities is not too great. It is preferable, however, both to remove the impurities from the iron oxide and, in a manner similar to that disclosed above, to reduce the iron oxide to direct reduced iron (DRI), to increase the value of the recovered product. The DRI then may be sent to a steel mill where it is used during the steel production process. The fumes exhausted by the steel mill, which typically are iron-poor, are then filtered through a baghouse, which may be located at the steel mill, or/and through a wet scrubber, which may also be located at the steel mill. The materials captured by the baghouse or/and wet scrubber may then be recycled back to the present recovery process, resulting in an efficient, ecological waste recovery process.

The waste material mixture, which typically includes franklinite and magnetite, is preroasted at temperatures greater than 500° C. for a predetermined period of time. The preroasting causes a decomposition of the franklinite zinc oxide-iron oxide complex into zinc oxide, iron oxide and other components. The preroasting process generally comprises the steps of adding heat to the waste material mixture and/or passing heated reducing gases through the waste material mixture. Although all reducing gases are suitable, hydrogen and carbon-containing gases such as carbon dioxide are preferred, as well as mixing carbon (activated) with the waste material mixture and preroasting in a gas containing oxygen. While some iron oxide is reduced from $Fe_2O_3$ and $Fe_3O_4$ to FeO, no elemental iron is produced during the preroasting step. Additionally, iron and iron oxides are not soluble to any degree in the basic ammonium chloride solution.

As the process continues, the exhausts from the preroasting process are collected and subjected to an ammonium chloride leach. Calcium leached out by the ammonium chloride begins to build up in concentration in the ammonium chloride solution. As calcium concentration increases, zinc solubility decreases, lowering the efficiency of the process. The calcium concentration can be reduced by the addition of a secondary ammonium salt, such as ammonium sulfate or ammonium hydroxide, to the primary ammonium chloride solution. The calcium ions will precipitate out as calcium sulfate if ammonium sulfate is added or as calcium hydroxide if ammonium hydroxide is added and the ammonium chloride solution with reduced calcium concentration now will leach zinc from the waste materials more efficiently.

Therefore, it is an object of the present invention is to provide a waste material recovery process which recovers chemical values from industrial waste streams, recycles exhaust fumes from furnaces such as electric arc furnaces and reduction furnaces, recycles exhaust fumes from industrial processes such as iron and steel making processes, and recycles other waste materials, including both iron-rich and iron-poor waste materials, to produce valuable products.

Another object of the present invention is to provide a process which uses the waste streams of various industrial processes, particularly the iron and steel making processes, so as to achieve an economical, environmentally friendly recycle process in the steel making industry.

Another object of the present invention is to provide a method for recovering iron and iron oxide from waste materials, such as exhaust fumes, furnace fumes, mill scale, used batteries, fly ash or flue dust, which contain other metals, such as zinc, lead oxide, and cadmium.

Another object of the present invention is to provide a method for recovering iron oxide which can be used as is as a feedstock for steel production processes.

Another object of the present invention is to provide a method for recovering an iron product such as direct reduced iron and/or iron oxide which is economical, quick and efficient.

Another object of the present invention is to provide a method for removing calcium from an ammonium chloride leach solution used to recover zinc oxide such that the ammonium and chloride ions are balances, resulting in the ability to maintain a continuous recovery process.

These objects and other objects, features and advantages of the present invention will become apparent to one skilled in the art after reading the following Detailed Description of a Preferred Embodiment.

DETAILED DESCRIPTION OF A PREFERRED EMBODIMENT

In the basic waste material recovery and recycle process disclosed herein and in several prior related patent specifications, including U.S. Pat. No. 5,208,004, by taking an iron containing waste stream comprising iron oxides, and roasting it at elevated temperatures under a reducing atmosphere, a product can be made which is equivalent to direct reduced iron. In general terms, heating the iron cake above 500° C. and preferably from about 980° C. up to about 1260° C., but typically no higher than 1315° C., a direct reduced iron product is formed. This direct reduced iron product then can be pelletized with carbon or with a sodium silicate, or other suitable compound, after it comes out of the furnace. The final product then can be used as a feedstock for steel mills without any additional treatment.

As discussed below as well as in the several prior related patent specifications, the step of preroasting the iron containing waste stream, such as an undissolved precipitate removed from the basic zinc oxide recovery process covered by U.S. Pat. No. 5,208,004 or a metal-making process exhaust stream, to reduce the iron oxide and to drive off and recover, if desired, any zinc, cadmium, and lead, and other impurities, is added to the end of a proprietary zinc oxide recovery process. The resulting iron product may have been reduced from several forms of the iron, such as FeO, $Fe_2O_3$, or $Fe_3O_4$, reduced to an iron extremely usable as the feedstock for steel mills.

The waste material processed, such as for example the combination of iron poor materials from a baghouse or wet scrubber and EAF flue dust, after first being preroasted to form an initial quantity of DRI, then is leached using ammonium chloride. The remaining undissolved precipitate in the ammonium chloride leach is, for the most part, an iron oxide cake, which also can be treated to recover additional DRI. The waste material also typically contains calcium in the form of lime (CaO) of which some also is leached by the ammonium chloride. In a fresh ammonium chloride solution, the solubility of calcium is relatively low (on the order of 2–3%). As shown in Table II, a typical flue dust contains calcium in the form of lime (CaO) which may be leached into the solution during the zinc oxide recovery process. The addition of the calcium ion, along with the processing of the leaching solution at various stages in the process, results in the loss of ammonium ion which is converted into ammonia and lost through the ventilation and scrubber system. This loss of ammonium ion unbalances the equilibrium of ammonium and chloride ions and results in the formation of calcium chloride. As the solution is repeatedly recycled, the concentration of calcium (and hence, calcium chloride) rises.

The solubility of zinc (from zinc oxide) in a fresh ammonium chloride solution (20% at 96° C.) is about 13%. As shown in Table I, the increase in the calcium chloride concentration of the leaching solution reduces the solubility of zinc. This drop in zinc solubility makes each leaching successively less effective since a smaller amount of material can be leached through each cycle.

TABLE I

| Solubility of ZnO in aqueous solution at 96° C. | | | |
| --- | --- | --- | --- |
| containing | 20% $NH_4Cl$ | | |
| | 4.0% NaCl | | |
| | 3.4% KCl | | |
| | 1.6% $MgCl_2$ | | |
| | and different quantity of $CaCl_2$ | | |
| | $CaCl_2$ Concentration | | |
| | 5% | 10% | 15% |
| Saturated solution contains: | | | |
| Calcium | 1.9% | 3.7% | 6.5% |
| Magnesium | 0.4% | 0.4% | 0.46% |
| Sodium | 1.2% | 1.2% | 1.4% |
| Zinc | 10.8% | 8.4% | 4.95% |

The addition of a soluble ammonium salt in which the negative ion will form an insoluble compound with calcium will remove calcium from the leach solution and at the same time balance the ammonium and chloride ions. Two such salts are ammonium hydroxide ($NH_4OH$) and ammonium sulfate ($(NH_4)_2SO_4$). The addition of ammonium hydroxide will result in the formation of calcium hydroxide which is insoluble and the addition of ammonium sulfate will result in the formation of calcium sulfate which also is insoluble. Other ammonium salts are considered within the scope of this invention.

The preferred ammonium salt is ammonium sulfate. Ammonium hydroxide will increase the system pH thereby resulting in the loss of a substantial amount of ammonia due to shifting the ammonium/ammonia equilibrium as the pH becomes more basic. Ammonium sulfate will keep the pH close to neutral while precipitating calcium sulfate. Iron-rich materials also may be added to be leached and further processed.

The method disclosed herein is carried out in its best mode in recovering the waste material from the waste streams of metal-making processes, industrial or other processes. These waste materials may be combined with other waste materials recovered from furnace exhaust streams. Many processes produce an iron poor waste stream, such as reduction furnaces and iron and steel making processes. Many other processes produce an iron oxide rich waste stream. Other processes remove iron oxide rich materials prior to processing. The iron poor materials are combined with a typical industrial waste stream which, after treatment, results in an iron-rich material suitable for use as a feedstock to a steel mill. Iron oxide rich materials also can be combined with the typical industrial waste stream and the iron poor waste stream. A typical industrial waste stream used is a flue gas where the charge contains galvanized steel, having the following percent composition:

TABLE II

Analysis of Flue Dust

| Component | Percent By Weight |
| --- | --- |
| Zinc Oxide | 39.64 |
| Iron Oxide | 36.74 |
| Lead Oxide | 5.72 |
| Inert Materials | 9.10 |
| Calcium Oxide | 2.80 |
| Potassium Oxide | 2.41 |
| Manganese Oxide | 1.29 |
| Tin Oxide | 1.13 |
| Aluminum Oxide | 0.38 |
| Magnesium Oxide | 0.33 |
| Chromium Oxide | 0.16 |
| Copper Oxide | 0.06 |
| Silver | 0.05 |
| Unidentified Materials | 0.22 |

General Process Description

Generally, the present process is a continuous method for the recovery of an iron product feedstock from waste material streams. The basic process steps comprise:

Basic Process Steps a. preroasting a typical industrial process waste material stream, such as from a metal or metal product process, to produce DRI and an exhaust stream;

b. treating the exhaust stream which may be a waste material combination comprising other waste streams, with an ammonium chloride solution containing ammonium sulfate at an elevated temperature to form a product solution and an undissolved precipitate comprising iron oxide;

c. separating the product solution from the undissolved precipitate comprising the iron oxide; and d. treating the undissolved precipitate in a roasting process resulting in the recovery of a relatively pure DRI product.

To the basic process steps, a number of additional steps may be added depending on the process conditions and iron properties desired. The additional steps include, either individually or in some combination:

1. Preroasting the solid waste material at an elevated temperature to form DRI.

2. Preroasting the solid waste material at an elevated temperature and in a reducing atmosphere to form DRI.

3. Pretreating the solid waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere to form DRI, and then treating the undissolved precipitate with an ammonium chloride solution at an elevated temperature to form a product solution and an undissolved precipitate comprising iron oxide, and separating the product solution from the undissolved precipitate.

4. Preroasting the solid waste material at an elevated temperature and optionally in a reducing atmosphere to form DRI, pretreating the waste material with an ammonium chloride solution at an elevated temperature to form a product solution and an undissolved precipitate comprising iron oxide, separating the product solution from the undissolved precipitate, roasting the undissolved precipitate at an elevated temperature and optionally in a reducing atmosphere to form additional DRI, and then treating the undissolved precipitate with an ammonium chloride solution at an elevated temperature to form a product solution and an undissolved precipitate comprising iron oxide, and separating the product solution from the undissolved precipitate.

To the basic process steps, additional iron product purification steps may be added. For example:

1. Elemental carbon can be added during the leaching step or steps to initiate the reduction of the iron oxide into direct reduced iron during the leaching step or steps. The elemental carbon may be added in a number of forms including, but not limited to, dust, granules, and pellets. The elemental carbon does not go into solution and remains with the undissolved precipitate.

2. Elemental carbon can be added to the undissolved precipitate after it has been separated from the product solution. Combining elemental carbon and iron oxide in this manner at an elevated temperature and under a reducing atmosphere also will initiate the reduction of the iron oxide into direct reduced iron. The elemental carbon can be mixed into the undissolved precipitate in a number of manners including, but not limited to ribbon blenders and mixers.

Preferred Embodiment

Figure 1:
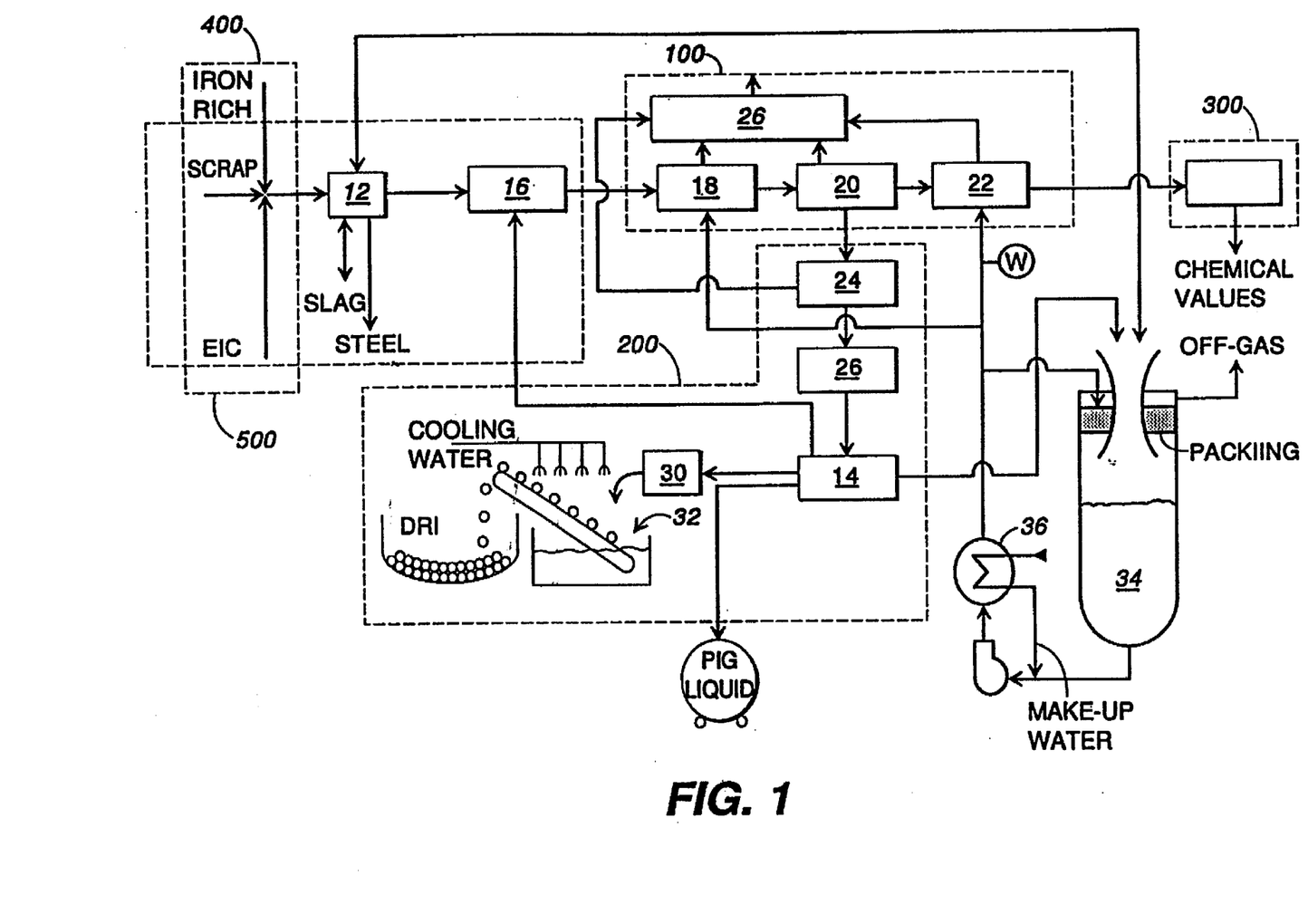
FIG. 1 is a schematic of a representative process which includes the present invention.

Referring to FIG. 1, a preferred embodiment of the process is shown. Subprocess 100, the digestion and filtration steps, generally comprises the process disclosed and claimed in related application Ser. No. 08/238,250, which also is disclosed above. Subprocess 200, the direct reduced iron production steps, generally comprises the process disclosed and claimed in related application Ser. No. 08/348,446, which also is disclosed above. Subprocess 300, the chemical values recovery steps, when combined with subprocess 100, generally comprises the process disclosed and claimed in related application Ser. No. 08/302,179, which also is disclosed above. Subprocess 400, the enhanced direct reduced iron production steps, when combined with subprocess 200, generally comprises the process disclosed and claimed in related application Ser. No. 08/360,394, which also is disclosed above. Each of subprocesses 200, 300, and 400 may be added to the general process. Removal of the calcium build-up is favorable to all of these subprocesses.

Subprocess 200 comprises the leaching steps where a calcium compound build-up or imbalance may occur. Subprocess 500 comprises the feed process and includes the relevant preroasting step. Feed streams such as iron poor waste fume streams from electric arc furnaces 12 and other furnaces such as reduction furnaces or smelters 14 are filtered in a baghouse 16. Other feed streams such as iron rich direct reduced iron and pig iron, as well as scrap iron and steel, are subjected to the iron or steel making process. Exhaust fumes from such processes, which typically include an electric arc furnace or other reduction furnace, also are filtered in a baghouse 16. The constituents filtered out in baghouse 16 comprise the waste stream feed to subprocess 100.

In subprocess 500, the waste feed stream is preroasted, resulting in the reduction of the iron compounds into DRI. This preroasting typically occurs at between about 500° C. and 1315° C., and preferably at between 980° C. and 1260° C. The DRI can be fed directly back into the industrial process, such as a steel making process. Exhausts from the preroasting step are recovered in a filter means, such as baghouse 16, and then subjected to the leaching and other chemical values recovery steps disclosed in the related applications below.

In subprocess 100, the waste stream feed is leached in digester 18 with ammonium chloride, preferably at approximately 90° C. and approximately 23% by weight concentration. Constituents soluble in ammonium chloride go into solution, while constituents insoluble in ammonium chloride, such as iron oxides, precipitate out. The precipitates are filtered from the solution in filter 20. The filtered solution is sent to cementer 22, and subjected to subprocess 200 to recover other chemical values. The precipitate, which is an iron cake (IC), is sent to subprocess 300.

In subprocess 300, the precipitate is dried and crushed in dryer/crusher 24. Exhaust gases from dryer/crusher 24 may be sent to a baghouse such as baghouse 16, but more typically are sent to an air scrubber such as air scrubber 26 for cleaning, as the exhaust gases from dryer/crusher 24 typically do not have a significant quantity of recoverable constituents. The dried and rushed precipitates are compacted in compactor 28 and sent to a reduction furnace or smelter 14. In reduction furnace 14, the dried and crushed iron cake is roasted at between 980° C. and 1315° C., producing an enriched iron cake (EIC) which can comprise direct reduced iron (DRI) and pig iron, which can be in liquid form. The EIC can be compacted in a second compactor 30, and then cooled by cooling water in a cooling conveyor 32, to produce the DRI. The DRI then can be used as the feed to a steel mill EAF, and the process cycle starts over.

Exhaust fumes from the reduction furnace 14 are sent to scrubber 34, which preferably is a recirculating wet scrubber using water or an aqueous ammonium chloride solution. Exhaust fumes from EAFs such as EAF 12 also can be sent to scrubber 34. In scrubber 34, the exhaust fumes are scrubbed and the scrubbed off-gas released. The water or aqueous ammonium chloride solution containing the constituents scrubbed from the exhaust fumes is sent either to cementer 22 or digester 18, depending on purity; more pure solutions typically are sent to digester 18, while less pure solutions typically are sent to cementer 22.

In one embodiment, the furnace 12, 14 off-gases comprise ZnO and other particulate impurities. If the off-gases are scrubbed in scrubber 34, the water balance is maintained using a temperature control such as heat exchanger 36. Additionally, the concentration of ZnO and other solubles in the scrubbing liquid may be controlled by the addition of water W to the cementer 22, or ammonium chloride to the scrubber 34. As discussed above, if an ammonium chloride solution is used as the scrubbing liquid, it is preferred to maintain the solution at approximately 90° C. and approximately 23% NH$_4$Cl.

Preroasting Process

The preroasting step, as mentioned above, can be carried out prior to the initial leaching step, and also optionally between a first and second leaching step. The waste stream containing the franklinite and magnetite, such as the waste dust or the combination of waste dust and the iron oxide rich material, is heated to temperatures greater than 500° C., but typically no greater than 1315° C. This temperature causes a reaction which causes a decomposition of the stable franklinite phase into zinc oxide and other components, and yet does not allow for the complete reduction of zinc oxide to zinc metal. The resulting zinc oxide can be removed by sublimation or extraction with an ammonium chloride solution, such as by following the steps detailed above under the general process. The resulting material after extraction has less than 1% by weight zinc.

The solid waste material can be preroasted using many conventional roasting processes, such as, for example, direct or indirect heating and the passing of hot gases through the dust. For example, non-explosive mixtures of reducing gases, such as hydrogen gas and nitrogen or carbon dioxide, can be passed through the powder containing franklinite and magnetite. Hydrogen gas is not the only species that may be used for reductive decomposition of franklinite. It is possible to use carbon or simple carbon containing species, including carbon-containing reducing gases and elemental carbon. Heterogeneous gas phase reductions are faster than solid state reductions at lower temperatures and therefore suggest the use of carbon monoxide. The carbon monoxide can be generated in situ by mixing the franklinite powder with carbon and heating in the presence of oxygen at elevated temperatures. The oxygen concentration is controlled to optimize CO production. The carbon monoxide may be introduced as a separate source to more clearly separate the rate of carbon monoxide preparation from the rate of Franklinite decomposition. The prepared zinc oxide then can be removed by either ammonium chloride extraction or sublimation.

The optional iron oxide rich material may be added to the process either before or after this preroasting step. As the preroasting step mainly is to assist in the decomposition of franklinite, if the iron oxide rich material is devoid of franklinite, it need not be subjected to preroasting.

Leaching Treatment

The exhaust stream from the preroasting step and, optionally a portion of the waste material, is subjected to an ammonium chloride leach. An ammonium chloride solution in water is prepared in known quantities and concentrations. If the two-stage leaching process is used, the feed material, such as the exhaust stream and waste material flue dust described in Table I combined with any other feed material source which contains iron oxide, is added to the ammonium chloride solution. Otherwise, the feed material first is roasted. The majority of the waste mixture, including any zinc and/or zinc oxide, lead oxide, cadmium oxide, and other metal oxides, dissolves in the ammonium chloride solution. The iron oxide does not dissolve in the ammonium chloride solution. As an example, the solubility of zinc oxide in ammonium chloride solutions is shown in Table III.

TABLE III

Solubility of ZnO in 23% NH$_4$Cl solution

| Temperature °C. | g Dissolved/100 g H$_2$O |
|---|---|
| 90 | 14.6 |
| 80 | 13.3 |
| 70 | 8.4 |
| 60 | 5.0 |
| 50 | 3.7 |
| 40 | 2.3 |

It has been found that a 23% by weight ammonium chloride solution in water at a temperature of at least 90° C. provides the best solubility for a waste mixture comprising a significant quantity of zinc oxide. Concentrations of ammonium chloride below about 23% do not dissolve the maximum amount of zinc oxide from the waste mixture, and concentrations of ammonium chloride above about 23% tend to precipitate out ammonium chloride along with the zinc oxide when the solution is cooled. Therefore, 23% has been chosen as the preferred ammonium chloride solution concentration. The iron oxide and inert materials such as silicates will not dissolve in the preferred solution.

As stated above, the addition of ammonium sulfate to the leaching solution is preferred. The ammonium sulfate can be added to the leach tank prior to charging with dust. The calcium sulfate which forms will be filtered out with the iron cake and returned to the steel making furnace. The calcium will calcine to calcium oxide when it is heated during the steel making process.

This method can also be used in using a rotary hearth furnace in the first step. The enriched dust in this process contains small amounts of calcium so that treatment will still be necessary on a smaller scale. The precipitated calcium sulfate along with unleached solids will be returned to the rotary hearth furnace. The calcium sulfate will form calcium oxide and return with the iron units to the steel making.

The zinc oxide, as well as smaller concentrations of lead or cadmium oxide, are removed from the waste mixture by the dissolution in the ammonium chloride solution. The solid remaining after this leaching step contains iron oxides and some impurities including zinc, lead, cadmium, and possibly some other impurities. The remaining solid then can be roasted in a reducing atmosphere, typically at a temperature greater than 420° C. and often at 700° C. to 900° C. The reducing atmosphere can be created by using hydrogen gas, simple carbon species gases such as carbon dioxide, or by heating the mixture in an oxygen containing gas in the presence of elemental carbon. The carbon preferably is in the form of dust or pellets. Typical preroasting times are from 30 minutes to 4 hours.

If the iron poor material is removed from the industrial waste stream using a wet scrubber, the preferred wet scrubber is an ammonium chloride solution wet scrubber. By using an ammonium chloride wet scrubber, the loaded scrubbing solution, ammonium chloride, can be combined directly with the ammonium chloride leachant, or sent directly to the cementation step for removal of certain non-iron products. Alternatively, the loaded ammonium chloride scrubbing solution may act as the primary leachant in Basic Process Step b. Depending on the degree of loadedness of the ammonium chloride scrubbing solution, pure make-up ammonium chloride solution can be added to increase the effectiveness of the ammonium chloride leachant.

As another alternate embodiment, iron-poor waste streams in both solid and liquid form may be added to the present process for treatment. The solid stream may be added to Basic Process Step a, while the liquid stream may be added to Basic Process Step b.

Optional Carbon Addition Step

The present process also can be operated to produce a high-quality iron-carbon cake as a residual product. The iron oxide contained in the waste stream does not go into solution in the ammonium chloride solution, but is filtered from the product solution as undissolved material. This iron oxide cake can be used as is as the feedstock to a steel mill; however, as previously discussed, it becomes more valuable if reduced by reaction with elemental carbon to produce an iron-carbon or direct-reduced iron product. One preferred method for producing such an iron-carbon or direct-reduced iron product from the waste material comprises the steps of, after first preroasting the waste stream:

a. treating the waste material left after the DRI has been removed with an ammonium chloride solution at an elevated temperature to form a product solution which comprises dissolved zinc and dissolved zinc oxide whereby any iron oxide in the waste material will not go into solution;

b. adding carbon to the product solution whereby the carbon will not go into solution; and then c. separating the product solution from the undissolved materials present in the product solution including any of the iron oxide and the carbon.

A mixture of iron oxide and carbon is used by the steel industry as a feedstock for electric arc furnaces. The iron oxide cake which is removed as undissolved material from the leaching step is primarily iron oxide, being a mixture of $Fe_2O_3$ and $Fe_3O_4$. The iron oxide cake can be made into the mixture of iron oxide and carbon by adding elemental carbon to the iron oxide cake in several manners. First, carbon can be added to the leaching tank at the end of the leaching step but before the undissolved materials are separated from the product solution. Since the carbon is not soluble in the ammonium chloride solution and will not react in an aqueous solution, the iron oxide cake and the carbon can be separated from the product solution and made into a hard cake. Different size carbon, such as dust, granules, or pellets, may be used depending on the desires of the steel makers. Second, the carbon can be added to the iron oxide after the iron oxide has been separated from the product solution. The dried iron oxide and the carbon can be ribbon blended in a separate process.

Combining carbon and iron oxide in a reducing atmosphere and at an elevated temperature results in the reduction of the iron oxide, producing direct-reduced iron (DRI). DRI can be used to replace part or all of the steel scrap charged to a steel mill. In some operations, DRI is preferred to scrap because it has a known uniform composition and generally contains no residual elements such as chromium, copper, nickel, and tin. When carbon-enriched iron oxide is melted, it forms a desired foamy slag because it contains both carbon and iron oxide. Because the price of steel scrap usually is lower than DRI, the use of DRI usually cannot be economically justified. DRI typically runs in the $120.00 and higher per ton range. However, since the iron oxide is a residual product of an economical recovery process, such as the recovery of zinc oxide from flue dust described generally below, with the main value of the process being from the zinc oxide product, the iron oxide or direct-reduced iron can be produced more economically. Therefore, the iron oxide produced as a residual in this process has significant value.

Generally the iron oxide and carbon product is pressed into a cake for ease of handling and use. The cake typically contains approximately 82% solids, but may range from 78% to 86% solids and be easily handled and used. Although cakes of less than 78% solids can be formed, the other 22%+ of material would be product solution which, if the cake is used as a feedstock to a steel mill, would be reintroduced to the steel-making process, which is uneconomical. Likewise, drying the cake to have more than 86% solids can be uneconomical.

The roasting process produces vapors, from the zinc, lead and cadmium and other impurities, that have to be condensed into dust. These impurities can be sent to the baghouse at the end of the steel making process, mixed into the original waste dust, and then sent to the first leaching step, in a recycle fashion. Alternatively, the exhaust vapors and dust from the roasting step may be sent to a separate baghouse at a stand alone facility.

There are two preferred ways to add carbon to the iron oxide cake. First, it may be beneficial when the iron oxide cake comes out of the reclamation process to grind up the iron oxide cake, pelletize it with carbon and put it in a roasting furnace. Second, carbon can be added to the furnace with the iron oxide.

The iron oxide cake can be treated in three manners. First, carbon can be added to the leaching step and the iron oxide cake will have carbon plus iron oxide. The iron oxide-carbon cake can go directly to the steel mill and, if it goes directly to the steel mill, then the reduction of the iron oxide would take place in the steel mill furnace. Second, the iron oxide-carbon cake can be pelletized and roasted in a reduction furnace to form direct reduced iron. The iron oxide precipitate, which typically contains around 80% solids, is ground up with carbon and formed into pellets, briquettes or cubes and then heated. These pellets, briquettes or cubes then can be introduced to a steel making furnace. The difference in the material that would be introduced to the furnace from the first manner and the second manner is that in the second manner, direct reduced iron is introduced to the steel making furnace, while in the first manner, a combination of iron oxide and carbon is introduced to the steel making furnace. The iron oxide plus carbon can be supplied to the steel mill as is. When this carbon enriched iron oxide is melted, it forms a foamy slag, and a foamy slag is desirable in steel making. Third, the carbon can be added through a ribbon blender, and then the iron oxide-carbon cake can be introduced either directly into the furnace or, preferably roasted in a reduction furnace first to form direct reduced iron, which would be preferred for steel making.

In order of preference, the first manner is the least preferable, that is adding the material itself as a mixture of carbon and iron oxide without any reducing agents mixed in with it. The second most preferable is the third manner, adding the material with carbon added to it either through the leaching step or through a ribbon blender and put directly into the furnace. The most preferable is the second manner, where carbon is added either though the leaching step or a ribbon blender, pelletizing or briquetting it, roasting it, and introducing it to the steel furnace.

In any manner, the fumes exhausting from the steel mill furnace and the reduction furnace typically are iron poor, but comprise other valuable components. The furnace exhaust fumes are an excellent source of iron poor waste materials useful for recovery in the present process. The exhaust fumes may be filtered in a baghouse, with the resulting filtrate being added to the waste stream feed of the present process, or with the resulting filtrate being the primary waste stream feed of the present process. The exhaust fumes also may be scrubbed in a wet scrubber, with the resulting loaded scrubbing solution being added to the ammonium chloride leachant of the present process. If an ammonium chloride scrubbing solution is used instead of water, the loaded ammonium chloride scrubbing solution may be used as the primary leachant of the present process.

Optional Recovery of Zinc Oxide From Product Solution

To recover the zinc oxide from the product solution in subprocess 300, while the filtered zinc oxide and ammonium chloride solution is still at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water. The solubility of diamino zinc dichloride in water is shown in Table IV.

TABLE IV

| Solubility of $Zn(NH_3)_2Cl_2$ in water | |
| --- | --- |
| Temperature °C. | g Dissolved/100 g $H_2O$ |
| 90 | 32 |
| 80 | 24 |
| 40 | 21 |
| 25 | 12.8 |

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful. The drying temperature should be kept below approximately 350° C. to prevent the sublimation of significant amount of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium contained in the feed materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative mounts of diamino zinc dichloride and zinc oxide species form. Significantly, all of the zinc can be recycled so that all of the zinc eventually will be converted into zinc oxide.

The crystallization step of the present process can be done continuously in order to increase the throughput and maximize the zinc oxide yield after the washing and drying step.

Optional Preroasting Step for Enhanced Zinc Recovery

The zinc dust obtained from various sources have shown by chemical analysis to contain from 20%–25% zinc by weight. X-ray diffraction indicates clearly the existence of certain crystalline phases in this dust, specifically zinc oxide. The positive identification of the iron phase is complicated by the possible structural types (i.e. spinel type iron phases showing almost identical diffraction patterns). The zinc oxide (as well as smaller concentrations of lead or cadmium oxide) are removed from the initial dust by dissolution in a concentrated ammonium chloride solution (23% ammonium chloride).

Filtration and washing of the undissolved species leaves a residual powder. This powder shows a zinc concentration that is still elevated (i.e., 10–13% by weight), but that is not zinc oxide. X-ray diffraction indicates that all crystalline phases can be identified by spinel type phases. The combination of chemical analysis and x-ray diffraction indicates that this powder is a combination of magnetite (iron oxide: $Fe_3O_4$). Both of these phases have very similar spinel type structures. The zinc within the franklinite, $(Fe, Mn, Zn)(FeMn)_2O_4$, cannot be removed by dissolution with ammonium chloride. In addition, no simple extraction process will remove zinc from this stable oxide phase. Although this compound is very stable to oxidation (all elements in the highest oxidation state), it is relatively easy to destroy this compound by reduction at elevated temperatures. The reduction of the franklinite in an atmosphere that cannot readily reduce zinc oxide or allow for the rapid oxidation of zinc to zinc oxide following reduction and subsequently recover the zinc oxide by ammonium chloride extraction or sublimation (the highly volatile zinc oxide will sublime from the mixture at relatively low temperatures and recondense at the cold locations of the roaster). The alternative will be complete reduction of the franklinite to zinc metal and removal by distillation or separation of the molten zinc by settling techniques. This can be accomplished by including the preroasting step disclosed above.

Iron By-Product Recycle

Iron-rich by-products produced during the recovery process can be processed further to obtain an end product which can be recycled back into the leaching step of the recovery process of the present invention. The iron-rich by-products preferably are reduced to DRI in a reduction furnace. During the reduction process, exhausts fumes which consists primarily of zinc, lead and cadmium are produced in the reduction furnace.

In accordance with a first embodiment, the DRI is sent to a steel mill where it is used in the production of steel. The steel production process results in exhaust fumes which are processed through the baghouse or/and a wet scrubber, either or both of which can be located at the steel mill. Fumes processed through the baghouse are filtered, and the captured solid residuum, along with an added amount of EAF dust, is recycled back into the waste materials stream whereby it is returned to the leaching step of the recovery process. Fumes processed through the wet scrubber are scrubbed in a liquid stream and the residual impurities obtained from the scrubbing process are discharged from the wet scrubber directly into the ammonium chloride solution of the leaching step.

In accordance with a second embodiment, the fumes exhausted from the reduction furnace used to produce the DRI are processed through the baghouse or/and the wet scrubber. Fumes processed through the baghouse are filtered, and the captured solid residuum is recycled back into the waste material stream, whereby it is returned to the ammonium chloride solution of the leaching step. In this embodiment, no EAF dust need be added in with the solid residuum. Fumes processed through the wet scrubber are scrubbed in a liquid stream and the residual impurities obtained from the filtering process are discharged from the wet scrubber directly into the ammonium chloride solution of the leaching step.

Therefore, iron-rich products which are produced during the recovery process of the present invention can be further processed to produce fumes consisting primarily of zinc, lead and cadmium which are captured in a baghouse or/and a wet scrubber and recycled back into the ammonium chloride solution of the leaching step to be used in the recovery process.

It should be noted that the locations of the baghouse and wet scrubber are a matter of design choice, plant efficiency and convenience. The present invention is not limited in this aspect. For example, steel mills are equipped with baghouses and wet scrubbers which can be used in the recycling process of the present invention. Similarly, the locations of the baghouse or wet scrubber used to process fumes from the DRI reduction furnace are also a matter of design choice, plant efficiency and convenience.

The above detailed description of a preferred embodiment is for illustrative purposes only and is not intended to limit the spirit or scope of the invention, or its equivalents, as defined in the appended claims.

What is claimed is:

1. A method for the removal of calcium products during a process for the recovery of zinc and iron from waste streams comprising iron oxides, zinc compounds and calcium constituents, comprising the steps of:
   a. preroasting said waste stream at an elevated temperature to produce a preroasted waste stream wherein at least a portion of the iron oxides are reduced to direct reduced iron;
   b. treating said preroasted waste stream with an ammonium chloride solution at an elevated temperature to form a solution which comprises dissolved zinc components and dissolved calcium constituents and an undissolved precipitate which comprises direct reduced iron and iron oxide, whereby any direct reduced iron and iron oxide in said waste stream will be contained in said undissolved precipitate and will not go into solution;
   c. treating said solution with a stoichiometrically suitable amount of a soluble ammonium salt in which the negative ion of the ammonium salt will form an insoluble compound with the calcium to form a product solution substantially free of calcium products and an undissolved calcium compound precipitate; and
   d. separating said product solution from said undissolved precipitate and said undissolved calcium compound precipitate.

2. The method as claimed in claim 1, wherein at least a portion of said direct reduced iron is removed prior to treating said waste stream with said ammonium chloride solution.

3. The method as claimed in claim 2, wherein the concentration of said ammonium chloride solution is approximately 23% by weight.

4. The method as claimed in claim 3, wherein said preroasting of said waste material combination is at an elevated temperature of at least 500° C. in a reducing atmosphere.

5. The method as claimed in claim 3, wherein said undissolved precipitate and said undissolved calcium compound precipitate are introduced as a feed stream for a steel making process.

6. The method as claimed in claim 1, wherein said ammonium salt is selected from the group consisting of ammonium hydroxide and ammonium sulfate.

7. The method as claimed in claim 4, wherein said preroasting step takes place in a rotary hearth furnace.

8. The method as claimed in claim 3, wherein said waste material stream is iron poor and comprises non-iron constituents.

9. The method as claimed in claim 3, wherein said waste material stream comprises iron constituents.

10. The method as claimed in claim 8, wherein said waste material stream further comprises iron constituents.

11. The method as claimed in claim 10, wherein said waste material stream is selected from the group consisting of waste streams from said preroasting step, waste streams from ore smelting processes, waste streams from metals making processes, waste streams from metals products making processes, waste streams from iron-making processes, and waste streams from steel-making processes.

12. The method as claimed in claim 11, wherein said waste material stream are fumes comprising particulate matter.

13. The method as claimed in claim 4, wherein said undissolved precipitate is roasted at a temperature of between 980° C. and 1315° C.

14. The method as claimed in claim 1 wherein said waste streams further comprise compounds which dissolve into ions comprising zinc-displaceable metal ions, further comprising the steps of:
   e. adding zinc metal to said product solution whereby any zinc-displaceable metal ions contained within said product solution are displaced by said zinc metal and precipitate out of said product solution as metals leaving a second product solution;
   f. separating said metals from said second product solution and lowering the temperature of said second product solution thereby precipitating at least a portion of any zinc components of said second product solution as a mixture of crystallized zinc compounds leaving a third product solution;
   g. separating said crystallized zinc compounds from said third product solution and washing said crystallized zinc compounds with a wash water thereby solubilizing certain of said zinc compounds; and
   h. drying said crystallized zinc compounds at a temperature of between about 100° C. and 200° C. resulting in the production of a zinc oxide product of 99% or greater purity.

* * * * *